(12) United States Patent
Sharpe

(10) Patent No.: US 7,518,847 B2
(45) Date of Patent: Apr. 14, 2009

(54) AC COUPLING-DC BLOCKING SURGE PROTECTION MODULE WITH DC BLOCKING BYPASS FUNCTIONALITY

(75) Inventor: Randall B. Sharpe, Chapel Hill, NC (US)

(73) Assignee: Alcatel Lucent, Paris (FR)

( * ) Notice: Subject to any disclaimer, the term of this patent is extended or adjusted under 35 U.S.C. 154(b) by 880 days.

(21) Appl. No.: 10/404,231

(22) Filed: Apr. 1, 2003

(65) Prior Publication Data
US 2004/0196602 A1    Oct. 7, 2004

(51) Int. Cl.
*H01H 73/00*    (2006.01)
(52) U.S. Cl. .................................... 361/116
(58) Field of Classification Search ............. 361/116
See application file for complete search history.

(56) References Cited

U.S. PATENT DOCUMENTS

| | | | |
|---|---|---|---|
| 5,546,267 A * | 8/1996 | Frederiksen et al. | 361/119 |
| 5,795,182 A * | 8/1998 | Jacob | 439/504 |
| 6,236,664 B1 * | 5/2001 | Erreygers | 370/492 |
| 6,259,775 B1 * | 7/2001 | Alpert et al. | 379/93.05 |
| 6,535,581 B2 * | 3/2003 | Singaliese | 379/29.01 |
| 6,744,853 B1 * | 6/2004 | Van Rooyen | 379/21 |
| 6,757,377 B1 * | 6/2004 | Bingel et al. | 379/373.01 |
| 6,785,325 B1 * | 8/2004 | Liu et al. | 375/220 |
| 7,088,818 B2 * | 8/2006 | Prendergast et al. | 379/403 |

* cited by examiner

*Primary Examiner*—Stephen W Jackson
*Assistant Examiner*—Ann T Hoang

(57) ABSTRACT

One embodiment of the disclosures made herein is a network equipment protection module configured for being removably mounted on a network equipment protector block. In accordance with such a network equipment protection module, the network equipment protection module includes surge protection circuitry configured for providing surge protection functionality, AC coupling-DC blocking circuitry configured for providing AC coupling-DC blocking functionality and DC blocking circuitry configured for providing DC blocking functionality. The DC blocking circuitry enables the DC blocking functionality to be selectively activated and deactivated. In this manner, such a network equipment protection module enables the combination of surge protection, DSL signal transmission, full metallic loop testing (MLT) and bridging of a DC voltage to be facilitated in association with a twisted pair transmission line.

17 Claims, 2 Drawing Sheets

AC COUPLING-DC BLOCKING SURGE PROTECTION MODULE WITH DC BLOCKING BYPASS FUNCTIONALITY

FIELD OF THE DISCLOSURE

The disclosures herein relate generally to surge protection devices and more particularly to surge protection devices configured for providing DC blocking functionality and/or AC coupling functionality.

BACKGROUND

Local exchange carrier access network equipment, such as Digital Loop Carriers (DLCs) and Digital Subscriber Access Multiplexers (DSLAMs), provide Digital Subscriber Line (DSL) service to subscribers over twisted wire pairs or "loops". The electronic components and systems comprised by DLC's and DSLAM's are protected through the use of protection devices (surge protectors) located near the network equipment from damage by induced voltage surges (e.g., via lightning strikes) picked up by the twisted wire pairs. Such surge protectors are essentially transparent to the network services (Plain Old Telephone Service (POTS), Asymmetrical Digital Subscriber Line (ADSL), etc.) while they shunt momentary high voltage surges to ground. The protectors are also essentially transparent to metallic loop test systems that test for faults on the twisted wire pair between subscriber premise equipment and upstream network equipment.

When remote electronics, typically located on the outside of a subscriber's premise, are powered over the twisted wire pair from a network equipment site or another remote location, power feed equipment for providing power to such remote electronics is coupled to the twisted wire pair. When the network electronics are AC coupled to the twisted wire pair, the power feed equipment can be directly bridged to the twisted wire pair. However, when the network electronics are DC coupled to the twisted wire pair, as would typically be the case for a combination POTS/ADSL line card, simple direct bridging cannot be implemented. For example, the voltage provided by the power feed equipment (e.g., nominally −200 Vdc) conflicts with the POTS "talk battery" voltage (nominally −48 Vdc).

Conventional approaches to providing a DC voltage on a twisted wire pair from power feed equipment are known. In cases where POTS is not required, conventional combination POTS/ADSL cards are replaced by ADSL-only cards, thus allowing the power feed to be applied without any conflicts. In cases where POTS and ADSL functionality is facilitated, even though the POTS signal is unused, combination POTS/ADSL signals are passed through a high pass filter for eliminating unused POTS talk battery voltage, thereby allowing resulting filtered signals to be bridged with the power feed.

However, such conventional approaches for providing the DC power feed over the twisted wire pair have significant limitations associated therewith. In the case where conventional combination POTS/ADSL cards are replaced by ADSL-only cards, such a conventional approach would have an adverse expense associated with replacing POTS/ADSL combination cards that are already deployed in a network with newly developed ADSL-only cards. Furthermore, replacing conventional combination POTS/ADSL cards with ADSL-only cards would require rewiring in the DLC or DSLAM cabinets or require installation of cross-connect cabinets for connecting reassigned lines out of the DLC or DSLAM cabinets. In the case where a combined POTS/ADSL signal is filtered, such high pass filtering of a signal from a DLC or DSLAM will prevent complete metallic loop testing (MLT), as MLT uses the spectrum down to DC for many tests (e.g., detecting resistive faults, detecting presence of foreign voltages, etc). Additionally, it is hard to selectively gain access to an individual twisted wire pair because multi-pair cable harnesses and multi-pair connectors are often pre-wired with the equipment in cabinets, leaving little available space to accommodate access to additional pairs and for the high pass filtering equipment.

Accordingly, a solution for enabling the combination of surge protection, DSL signal transmission, full metallic loop testing and bridging of a DC power feed to be facilitated in association with a twisted wire pair in a manner that overcomes limitations associated with conventional solutions would be useful.

DETAILED DESCRIPTION OF THE DRAWINGS

Embodiments of the disclosures made herein relate to a network equipment protection module for use with central office or remote DSL network equipment (e.g., DSLAMs, DLCs, etc). Such a network equipment protection module enables the combination of surge protection, DSL signal transmission, full metallic loop testing (MLT) and bridging of a DC power feed to be facilitated in association with a twisted pair transmission line (also referred to herein as a twisted wire pair) in a manner that overcomes limitations associated with conventional solutions for providing such functionality. Accordingly, voltage provided by power feed equipment (e.g., nominally 200 Vdc) may be provided to a subscriber premise DSL network termination device (NTD) over the twisted pair transmission line, without inhibiting full MLT functionality. A DSL NTD is an example of such a subscriber premise DSL NTD that relies on voltage provided by power feed equipment via an attached twisted pair transmission line. A DSL NTD is an active device powered from upstream power feed equipment and which, in at least one embodiment, provides POTS functionality via ADSL data transmission (i.e., POTS talk battery voltage not provided over an attached twisted pair transmission line), Network equipment protection modules in accordance with embodiments of the disclosures made herein (i.e., an AC coupling-DC blocking surge protection module with DC blocking bypass functionality) offer a number of benefits. One benefit is that they are direct replacements for conventional surge protectors as used in conventional protector blocks. Accordingly, they do not require any re-wiring of the twisted pair transmission lines at the DLC or DSLAM cabinet. Another benefit is that they don't require costly replacement of combination ADSL/POTS cards at the DLC or DSLAM, thus being a less expensive approach. Still another benefit is that the overall approach requires no additional space in a DLC or DSLAM. Yet another benefit is that they do not inhibit full metallic loop testing.

Figure 1:
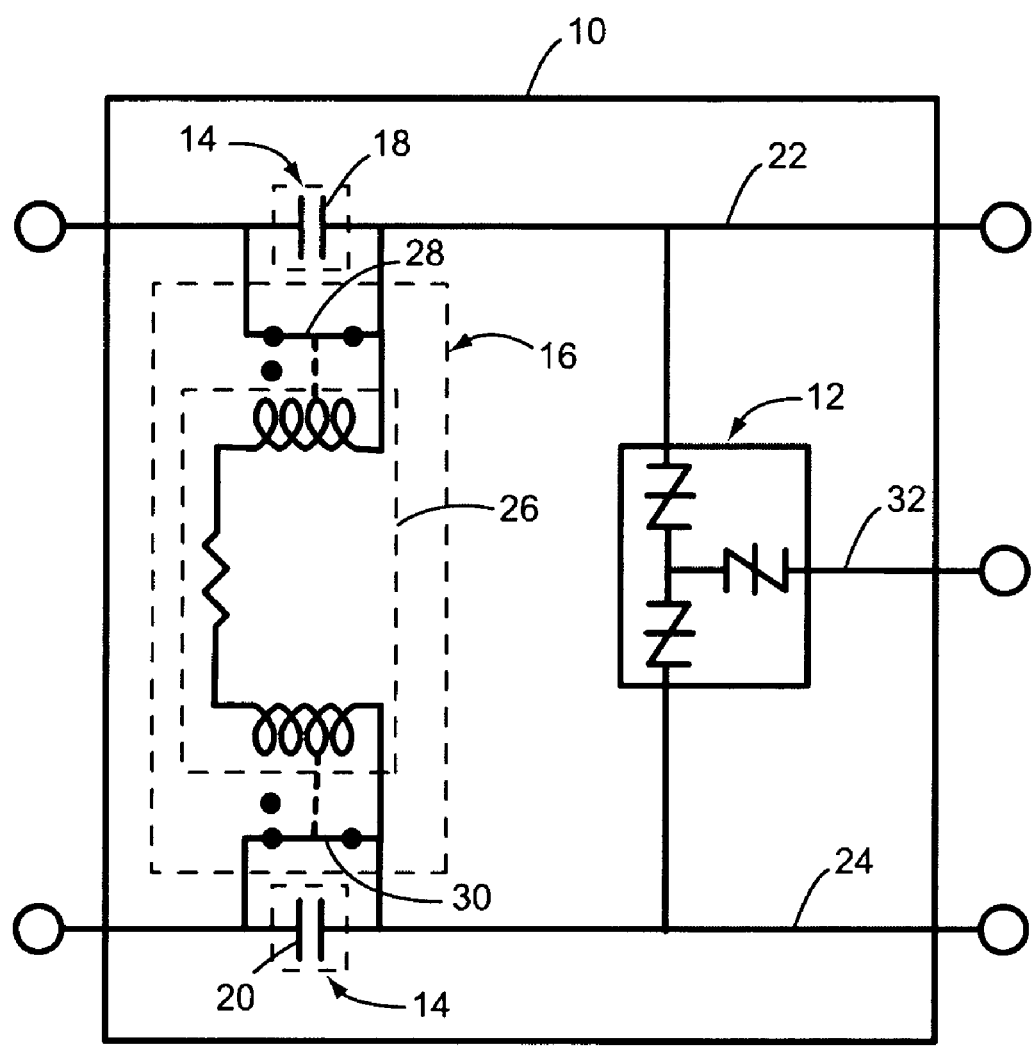
FIG. 1 depicts a network equipment protection module in accordance with an embodiment of the disclosures made herein.

Turning now to discussion of specific drawings, a network equipment protection module 10 in accordance with an embodiment of the disclosures made herein is depicted in FIG. 1. The network equipment protection module 10 includes surge protection circuitry 12 configured for providing surge protection functionality, AC coupling-DC blocking circuitry 14 configured for providing AC coupling-DC blocking functionality and DC blocking bypass circuitry 16 configured for providing DC blocking bypass functionality. In at least one embodiment of the disclosures made herein, the surge protection circuitry 12, the AC coupling-DC blocking circuitry 14 and the DC blocking bypass circuitry 16 are all contained in a discrete packaging device.

An enclosure having a plurality of contacts mounted thereon and externally accessible therefrom is an example of the discrete packaging device. In accordance with an embodiment of the disclosures made herein, the discrete packaging device is configured for being mounted on an unmodified commercially-available equipment protector block, which is OEM-configured for having conventional surge protectors mounted thereon. One example of such a commercially available equipment protector block is a 310-series equipment protector block offered by AVAYA Incorporated. One example of such conventional surge protectors is a 5-pin surge protector module offered by Marconi Communications Incorporated.

The AC coupling-DC blocking circuitry 14 includes a first capacitor 18 and a second capacitor 20 connected in series with a first power lead 22 and a second power lead 24, respectively (i.e., a pair of power leads). The first capacitor 18 and the second capacitor 20 represent one embodiment of means for providing AC coupling-DC blocking functionality. In at least one embodiment of the AC coupling-DC blocking circuitry, the first capacitor 18 and the second capacitor 20 have a capacitance of about 1 micro Farad. It will be appreciated that the specific capacitance for the capacitors (18, 20) will be specified dependent upon the specific implementation of the network equipment protection module 10.

The DC blocking bypass circuitry 16 includes a control portion 26 connected between first power lead 22 and the second power lead 24. The control portion 26 is configured for enabling a first shunt 28 and a second shunt 30 to be selectively connected and disconnected across the first capacitor 18 and the second capacitor 20, respectively. When a suitable DC voltage is applied across the pair of power leads (22, 24), the control portion 26 of the DC blocking bypass circuitry 16 is activated (i.e., in response to current flows through the control portion 26) and acts to disconnect the shunts (28, 30) from across the respective one of the capacitors (18, 20) whereby DC blocking functionality is activated. When the DC voltage is removed from across the pair of power leads (22, 24), the control portion 26 of the DC blocking bypass circuitry 16 is de-activated, thereby deactivating (i.e., bypassing) DC blocking functionality by allowing the shunts (28, 30) to be connected across the respective one of the capacitors (18, 20). In this manner, the DC blocking bypass circuitry 16 is configured for enabling the DC blocking bypass functionality to be selectively activated and deactivated. The DC blocking bypass circuitry 16 represents one embodiment of means for providing DC blocking bypass functionality.

A pair of normally-closed relay paths is an example of the first shunt 28 and the second shunt 30. It is contemplated herein that such a pair of normally-closed relay paths may be facilitated via a single relay or a plurality of relays (e.g., 2 relays). An actuation coil relay of a single relay is one example of the control portion 26 of the DC blocking bypass circuitry 16. Actuation coils of a pair of relays having a resistor connected therebetween (i.e., for limiting current flow through the actuation coils) are another example of the control portion 26 of the DC blocking bypass circuitry 16. Embodiments of the disclosures made herein are not limited to solid-state and mechanical relays, but may utilize any useful circuitry or component that provides relay functionality.

The surge protection circuitry 12 is connected between the pair of power leads (22, 24) and a ground lead 32. A Transient Voltage Suppression (TVS) device such as a SIDACtor brand TVS device or similar TVS device is an example of the surge protection circuitry 12. The surge protection circuitry 12 is an example of means for providing surge protection.

Figure 2:
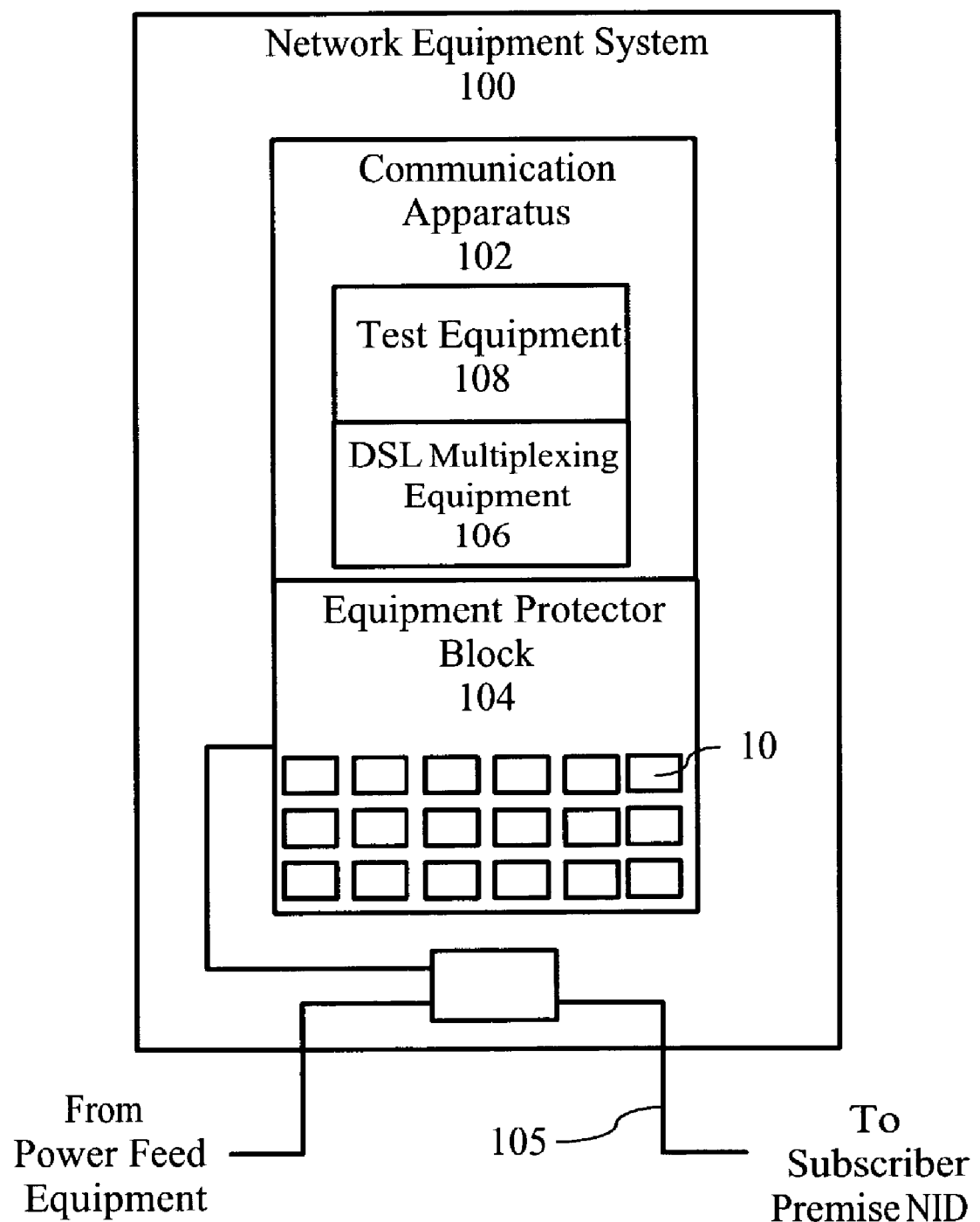
FIG. 2 depicts an embodiment of a network equipment system in accordance with an embodiment of the disclosures made herein.

FIG. 2 depicts an embodiment of a network equipment system 100 in accordance with an embodiment of the disclosures made herein. The network equipment system 100 includes a communication apparatus 102, an equipment protector block 104 and a plurality of network equipment protection modules 10 (as disclosed above in reference to FIG. 1) mounted on the equipment protector block 104. The equipment protector block 104 is connected between the communication apparatus 102 and a subscriber premise DSL NTD (not shown) via a twisted pair transmission line 105. In practice, the equipment protector block in a DLC and DSLAM is pre-installed and pre-wired to the communication apparatus 102 (or at least to a backplane through which connections to such apparatus is made).

A DC voltage (e.g. −200 Vdc), which is supplied by power feed equipment (not shown), is bridged onto the twisted pair transmission line 105 (e.g., at a junction block). Such power feed equipment may be located locally or remotely with respect to the communication apparatus 102. The DC blocking circuitry 16 of the network equipment protection modules 10 inhibits the DC power feed voltage from being applied to the communication apparatus 102.

The communication apparatus 102 includes DSL multiplexing equipment 106 and test equipment 108. The equipment protection block 104 is connected to the DSL multiplexing equipment 106 and/or the test equipment 108. It is contemplated that the equipment protection block 104 is connected directly to the DSL multiplexing equipment 106 and that the test equipment 108 transmits signals downstream through the equipment protection block 104 via the DSL multiplexing equipment 106.

A DLC (e.g., a common control shelf and channel bank assemblies) and a DSLAM are two examples of the DSL multiplexing equipment 106. In at least one embodiment of the disclosures made herein, the test equipment 108 is configured for performing Metallic Loop Test (MLT) functionality. Accordingly, MLT test equipment is an example of the test equipment 108. The combination of the equipment protector block 104 and at least one of the network equipment protection modules 10 is an example of a network equipment protection apparatus.

In operation, a plurality of network equipment protection modules 10 is plugged into (or otherwise operably mounted on) the equipment protection block 104. One or more of the network equipment protection modules 10 may replace one or more conventional surge protectors mounted thereon. Each one of the network equipment protection modules 10 is configured for providing surge protection, AC coupling-DC blocking functionality and DC blocking bypass functionality. The DC blocking bypass functionality allows full metallic loop testing to be performed while the power feed (i.e., DC voltage) is removed from the twisted pair transmission line 105. Use of the preinstalled and pre-wired equipment protection block 104 and the selective application of the equipment protection modules 10 allows power to be provided to individual twisted pair transmission lines without requiring line cards to be replaced, OSS reassignment, rewiring, and service outages to customers on the same line cards who are retaining POTS capability.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. To avoid unnecessary detail, the description omits certain information known to those skilled in the art. The preceding detailed description is, therefore, not intended to be limited to the contrary, it is intended to cover such an be reasonably included within the spirit

What is claimed is:

1. A network equipment protection module configured for being removably mounted on a network equipment protector block, the network equipment protection module comprising:
    a pair of power leads;
    surge protection circuitry configured for providing surge protection functionality, wherein said surge protection circuitiy is coupled to the pair of power leads;
    AC coupling-DC blocking circuitry coupled to the pair of power leads, wherein said AC coupling-DC blocking circuitry is configured for providing AC coupling-DC blocking functionality; and
    DC blocking bypass circuitry configured for providing DC blocking bypass functionality, wherein said DC blocking bypass circuitry is electrically connected directly across said power leads whereby said DC blocking bypass circuitry is automatically energized in response to DC voltage being provided between the pair of power leads wherein said DC blocking bypass circuitry causes at least one shunt to be selectively connected and disconnected across said AC coupling-DC blocking circuitry thereby allowing said DC blocking bypass functionality to be selectively activated and deactivated, wherein said at least one shunt is connected across said AC coupling-DC blocking circuitry until said DC voltage is provided between the pair of power leads and wherein said at least one shunt is disconnected from across said AC coupling-DC blocking circuitry when said DC voltage provided between the pair of power leads activates a control portion of said DC blocking bypass circuitry.

2. The network equipment protection module of claim 1 wherein:
    all of said circuitry are contained in a discrete packaging device; and
    the discrete packaging device is configured for being mounted on an unmodified commercially-available equipment protector block that is OEM-configured for having conventional surge protectors mounted thereon.

3. The network equipment protection module of claim 1 wherein:
    the AC coupling-DC blocking circuitry includes a capacitor connected in series with a first one of the pair of power leads;
    the control portion is connected directly between the pair of power leads at a location between said AC coupling-DC blocking circuitry and said surge protection circuitry and automatically activated in response to electrical current resulting from said DC voltaae fowing through the control portion;
    the DC blocking bypass circuitry is configured for causing the shunt to be selectively connected and disconnected across the capacitor; and
    the control portion of the DC blocking bypass circuitry causes the shunt to be disconnected from across the capacitor when said DC voltage is provided between the pair of power leads.

4. The network equipment protection module of claim 3 wherein the shunt consists of a normally closed path of a relay.

5. The network equipment protection module of claim 4 wherein:
    all of said circuitry are contained in a discrete packaging device; and
    the discrete packaging device is configured for being mounted on an unmodified commercially-available equipment protector block that is OEM-configured for having conventional surge protectors mounted thereon.

6. The network equipment protection module of claim 3 wherein the surge protection circuitry is connected between the pair of power leads and a ground lead.

7. A network equipment protection module configured for being removably mounted on a network equipment protector block, the network equipment protection module comprising:
    means for providing surge protection functionality coupled to a pair of power leads;
    means for providing AC coupling-DC blocking functionality coupled to the pair of power leads; and
    means for providing DC blocking bypass functionality, wherein said means for providing DC blocking bypass functionality includes causing said AC coupling-DC blocking functionality to be selectively activated when DC voltage is provided between the pair of power leads, wherein said means for providina DC blocking bypass functionality is electrically connected directly across said power leads whereby said means for providing DC blocking bypass circuitry is automatically energized in response to DC voltaae being provided between the pair of power leads, wherein said DC blocking bypass functionality is maintained in an activated state until said DC voltage is provided between the pair of power leads and wherein said DC blocking bypass functionality is automatically transitioned to a deactivated state when said DC voltage is provided between the pair of power leads.

8. The network equipment protection module of claim 7 wherein:
    all of said means are contained in a discrete packaging device; and
    the discrete packaging device is configured for being mounted on an unmodified commercially-available protector block that is OEM-configured for having conventional surge protectors mounted thereon.

9. The network equipment protection module of claim 7 wherein:
    said means for providing AC coupling-DC blocking functionality include a capacitor connected in series with a first one of the pair of power leads;
    said means for providing the DC blocking bypass functionality includes a controi portion automatically activated in response to electrical current resulting from said DC voltage flowing through the control portion and connected directly between the pair of power leads at a location between said means for providing AC coupling- DC blocking functionality and means for providing surge protection functionality;

said means for providing DC blocking bypass functionality is configured for causing the shunt to be selectively connected and disconnected across the capacitor; and the control nortion of said means for providing DC blocking bypass functionality causes the shunt to be disconnected from across the capacitor when said DC voltage is provided between the pair of power leads.

10. The network equipment protection module of claim 9 wherein the shunt consists of a normally closed path of a relay.

11. The network equipment protection module of claim 9 wherein:

all of said means are contained in a discrete packaging device; and the discrete packaging device is configured for being mounted on an unmodified commercially-available protector block that is OEM-configured for having conventional surge protectors mounted thereon.

12. The network equipment protection module of claim 9 wherein said means for providing surge protection functionality is connected between the pair of power leads and a ground lead.

13. A network equipment protection apparatus, comprising:

a protection module including circuitry configured for providing surge protection functionality, for providing AC coupling-DC blocking functionality, for providing DC blocking bypass functionality and for causing said DC blocking bypass functionality to be selectively activated and deactivated, wherein said DC blocking bypass functionality includes causing at least one shunt to be selectively connected and disconnected across a portion of said circuitry configured for providing said AC coupling-DC blocking functionality thereby allowing said DC blocking bypass functionality to be selectively activated and deactivated, wherein the portion of said circuitry configured for causina said DC blocking bypass functionality to be selectively activated and deactivated is electrically connected directly across a pair of power leads extending between a portion of said circuitry confianred for providing said AC coupling-DC blocking functionality and a portion of said circuitry configured for providing said surge protection functionality whereby said at least one shunt is automatically disconnected from across the nortion of said circuitry configured for providing said AC coupling-DC blockina functionality in response to DC voltage being provided between the pair of power leads, wherein said at least one shunt is connected across the portion of said circuitry configured for providing said AC coupling-DC blocking functionality until said DC voltage is provided between the pair of power leads, and wherein said blocking bypass functionality includes causing said at least one shunt to be disconnected from across the portion of said circuitry configured for providing said AC coupling-DC blocking functionality when said DC voltage provided between the pair of power leads energizes the portion of said circuitry configured for causing said DC blocking bypass functionality to be selectively activated and deactivated; and an equipment protector block configured for being connected between a communication apparatus and a subscriber premise DSL network termination device (NTD) and for having the protection module mounted thereon;

wherein the protection module enables said functionalities to be implemented in association with the communication apparatus and the DSL NTD when the protection module is mounted on the equipment protector block.

14. The network equipment protection apparatus of claim 13 wherein:

said circuitry is contained in a discrete packaging device;

the discrete packaging device is configured for being mounted on the equipment protector block; and the equipment protector block is an unmodified commercially-available equipment protector block that is OEM-configured for having conventional surge protectors mounted thereon.

15. The network equipment protection apparatus of claim 13 wherein:

the portion of said circuitry configured for providing AC coupling-DC blocking functionality includes a capacitor connected in series with a first one of the pair of power leads;

the nortion of said circuitry confinured for causing said DC blocking bypass functionality to be selectively activated and deactivated is activated in response to electrical current resulting from said DC voltage flowing therethrouah and is connected directly between the pair of power leads at a location between said AC coupling-DC blocking circuitry and said surge protection circuitry;

the portion of said circuitry configured for providing said DC blocking bypass functionality is configured for causing the shunt to be selectively connected and disconnected across the capacitor; and the portion of said circuitry configured for causing said DC blocking bypass functionality to be selectively activated and deactivated causes the shunt to be disconnected from across the capacitor when said DC voltage is provided between the pair of power leads.

16. The network equipment protection apparatus of claim 15 wherein the shunt consists of a normally closed path of a relay.

17. The network equipment protection apparatus of claim 16 wherein:

said circuitry is contained in a discrete packaging device;

the discrete packaging device is configured for being mounted on the equipment protector block; and the equipment protector block is an unmodified commercially-available equipment protector block that is OEM-configured for having conventional surge protectors mounted thereon.

* * * * *